March 29, 1966  A. SILVERSTEIN  3,243,496
MAGNETOMETER HOUSING
Filed March 31, 1964
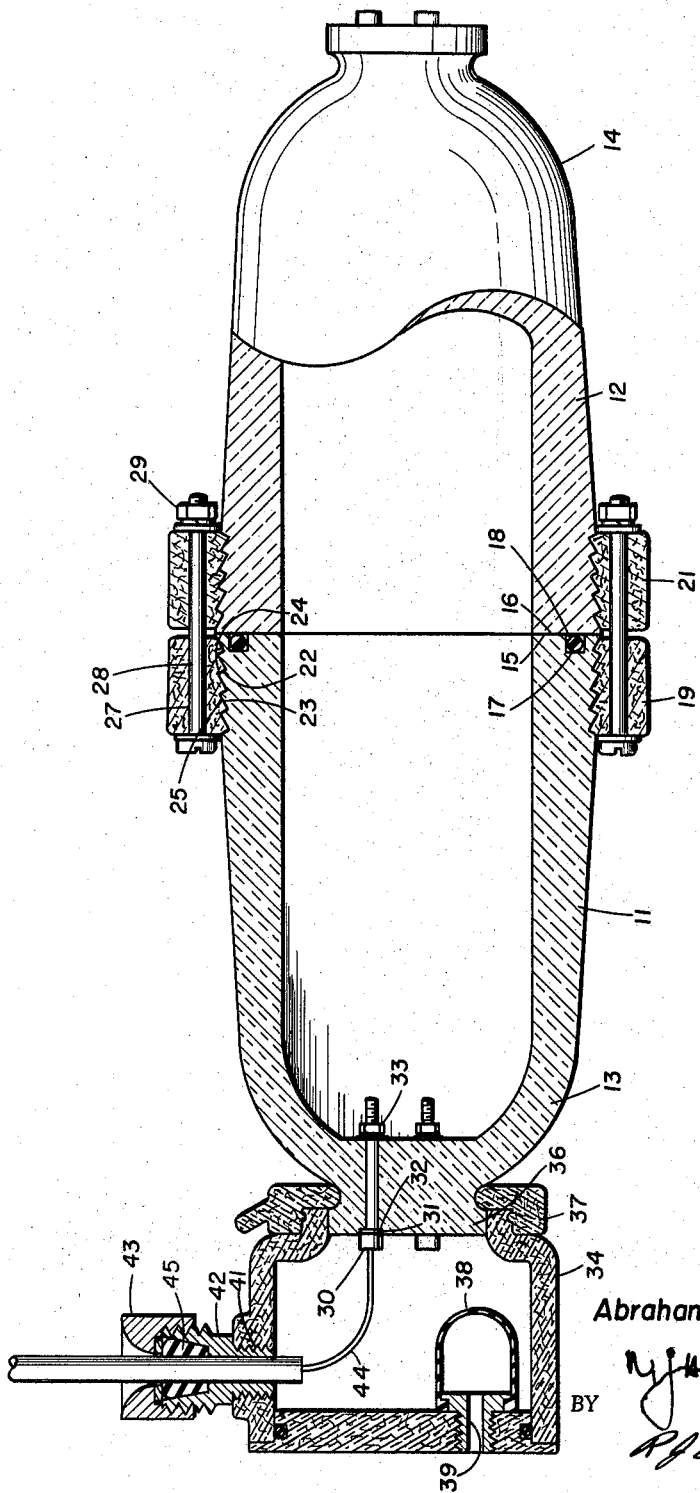
Abraham Silverstein
INVENTOR.
BY
ATTORNEY.
AGENT.

United States Patent Office 3,243,496
Patented Mar. 29, 1966

3,243,496
MAGNETOMETER HOUSING
Abraham Silverstein, Hyattsville, Md., assignor to the United States of America as represented by the Secretary of the Navy
Filed Mar. 31, 1964, Ser. No. 356,326
4 Claims. (Cl. 174—18)

The invention described herein may be manufactured and used by or for the Government of the United States of America for governmental purposes without the payment of any royalties thereon or therefor.

The present invention relates to improvements in high pressure vessels and more specifically to a new and improved underwater magnetometer housing capable of withstanding great external hydrostatic pressures without permitting leakage of water into the interior of the housing.

In the field of oceanography, it has been the general practice to employ magnetometer housings comprising a pair of oppositely disposed metallic cup-shaped members having integrally formed external flanges adjacent the open ends thereof, whereby the flanges may be bolted together to form a closed metallic magnetometer housing. Although such devices have served the purpose with some success, they have not proved entirely satisfactory under all conditions of service because, when submerged to great depths, the extreme hydrostatic pressures develop compressive forces in the walls of the housing which tend to shrink the housing to a smaller volume and thereby establish concentrated tensional forces at the juncture of the flanges to the housing which weakens the housing and often results in leakage. It has also been found that metallic containers become depth softened, i.e., they become less resistant to mechanical impact while exposed to high hydrostatic pressures. Moreover, metallic magnetometer housings are undesirably heavy and have a magnetic permeability which is too high to be ideally suited for use in the construction of such housings.

It is the general purpose of this invention to provide a magnetometer housing which possesses all of the advantages of the prior art but which is constructed in such a manner as to eliminate the concentration of any undesirable forces tending to weaken the structure. This invention further provides a magnetometer housing which is relatively light weight, has a low magnetic permeability and is constructed of a material which becomes depth hardened. These results are achieved by the use of a polycrystalline material in the construction of a housing comprised of two oppositely disposed cup-shaped members having independent annular clamping bands separably fitted to the outer peripheral surfaces of the open ends of said members.

OBJECTS OF THE INVENTION

An object of the present invention is the provision of a nonmagnetic magnetometer housing capable of submergence to great depths without permitting leakage of water into the interior of the housing.

A further object of the invention is the provision of a magnetometer housing which takes advantage of the hydrostatic pressures to further effect a watertight seal and which simultaneously eliminates the concentration of any undesirable forces tending to weaken the structure.

The figure shows a side elevation, partially in section, of a preferred embodiment of the invention.

In the drawings, there is shown a magnetometer housing consisting of first and second oppositely disposed cup-shaped members 11 and 12, respectively, which are each closed at one end by integrally formed spherical end sections 13 and 14, respectively, and terminate at their open ends in flat annular surfaces 15 and 16 respectively. The two cup-shaped members and spherical end sections are constructed of a polycrystalline material which is electrically nonconductive and which has a relative magnetic permeability of one, such as ceramic materials. The polycrystalline structure permits grinding of the sealing surfaces and the production of other surface flaws without the danger that the flaws will be propagated through the body of the material as would be the case with an amorphous material such as glass. The annular surfaces 15 and 16 are carefully ground to eliminate or minimize any irregularities in said surfaces, and an annular groove 17 is formed in one of said surfaces to receive a resilient O-ring 18 which sealingly contacts the other of said surfaces. When exposed to high hydrostatic pressures, the O-ring is compressed to form a watertight seal but cannot rupture and dislodge from its seat to be pushed through the space between surfaces 15 and 16 because that space is reduced to a minimum by the grinding of surfaces 15 and 16.

The two cup-shaped members are held in abutting contact at their annular sealing surfaces by a pair of annular clamping rings or bands 19 and 21 which surround and contact the external peripheral surface of said cups in spaced apart relationship adjacent to the open ends thereof. Each of the cups is provided with a series of upstanding annular ribs 22 formed on the exterior peripheral surface thereof adjacent the open ends of the cups. Each of the ribs 22 is defined by a pair of outwardly directed inclined annular walls 23 and 24 of unequal widths, the narrowest of which is disposed nearer to the open end of the cup than the wider wall 23. The clamping bands 19 and 21, are formed in the preferred embodiment, of a filament reinforced glass fiber material such as that known to the trade as "Fiberglas" and have complementary grooves and ribs 25 formed in the inner peripheral surfaces thereof to interlock with the ribs 22 and surfaces 23 and 24 of the cup-shaped members, and form an interference fit therewith. Various methods of providing the interference fit may be employed, for example, an annular "Fiberglas" ring having a smooth inner diameter which is slightly greater than the outer diameter of the cup-shaped member may be placed concentrically around ribs 22 and then an epoxy, which has a similar coefficient of thermal expansion and which will adhere to the ring but not to the ribs 22, may be poured into the annular space between the ring and the ribs. Upon hardening, the epoxy forms ribs 25 which are bonded or adhered to the ring and which form an interference with the ribs 22. Alternatively, the entire annular band and integral ribs 25 may be formed by winding layers of a wetted "Fiberglas" strand upon the cup-shaped member. Each of the clamping bands has a plurality of apertures 27 formed therein and extending therethrough coaxially with the axes of said rings, which apertures are spaced circumferentially around the rings. The clamping rings are positioned upon the cup-shaped members with the apertures of one ring in coaxial alignment with the apertures of the second ring to facilitate the passage of a single bolt 28 through an aperture in each ring. A bolt 28 is inserted into each set of aligned apertures 27 and is fitted with a nut 29 so that when the plurality of bolts are tightened, the two annular clamping bands are moved laterally in a direction toward one another to decrease the space existing between the adjacent sides of said bands. As a result of the interlocking relationship of the ribs and grooves on the inner peripheral surfaces of the annular bands with the ribs and grooves on the outer peripheral surfaces of the cup-shaped members, tightening of the bolts causes the two cup-shaped members to be drawn together in abutting contact with one another at annular surfaces 15 and 16 and further causes the development of compressional forces in the walls of the cup-shaped members. A considerable clamping force may be developed by the clamping bands 19 and 21 because of the particular contour of the ribs formed in said clamping bands and on said cup-shaped members, which upon tightening of the bolts 28 creates forces of compression and shear on said ribs 22 and 25 thus utilizing the full strength of the materials comprising the ribs. At each end of the magnetometer housing, a plurality of electrically conductive pins 30 are inserted in through apertures formed in the end sections 13 and 14 of the housing. Sealing washers 31, made of Teflon for example, are seated on shoulders 32 formed by counterbores and provide a watertight seal around the electrically conductive pins when nuts 33 threaded onto the pins are tightened. These pins provide an electrically conductive path between the exterior of the housing and an electrical instrument which is to be mounted interiorly of the housing.

To guard against any tensional forces being exerted upon the pins 30 which would tend to impair the watertight seal around the pins, a nonmagnetic junction box 34 is mechanically coupled to the neck portion 36 of the housing by means of a two-piece clamp 37. The junction box, which may be made of "Fiberglas" or similar materials, is filled with oil and has an elastic membrane 38 sealingly disposed across an aperture 39 formed in one wall of the box. Fitted into a second aperture 41 formed in a wall of the junction box is a stuffing-box 42 type of seal which is externally threaded at each end to screw into aperture 41 and to receive an internally threaded cap 43 at its other end. A cable having electrically conductive wires 44 is passed through the stuffing-box and through a generally cylindrical packing gland 45, the wires being attached to pins 30 with slack in the wire to avoid the transmission of tensional forces in the wires to the pins. The oil which fills the junction box serves a twofold purpose; firstly, the oil prevents salt water from contacting and corroding the connection of the wires 44 to pins 30, and secondly, since the elastic membrane functions to equalize the oil pressure with the hydrostatic pressure, the absence of a pressure differential across the stuffing-box simplifies the achievement of a watertight seal across the stuffing-box and eliminates any stresses on the cable which would be induced by a pressure differential. A second junction box, not shown, is provided at the opposite end of the housing for the same purpose.

In operation, the device of this invention has proved very successful in all depths for reasons which will be explained. The carefully ground surfaces 15 and 16 provide a watertight seal between the two cup-shaped members when these members are drawn together by the clamping bands 19 and 21. When the assembly is submerged the hydrostatic pressures develop compressional forces throughout the entire walls of the two cup-shaped members, causing some compression and shrinkage in volume of the entire housing. Under such circumstances, the hydrostatic pressures are utilized to advantage to exert even greater pressures at the abutting surfaces 15 and 16 than imposed by the clamping bands and thereby serve to develop an even tighter seal between the annular surfaces. Due to the fact that the clamping rings 19 and 21 are not integrally formed with the cup-shaped members nor securely bonded thereto, but are rather separable therefrom and closely fitted in an interlocking connection therewith, the aforementioned contraction or shrinkage of the walls of the cup-shaped members under the high hydrostatic pressures does not develop any concentration of undesirable tensional forces at the junction of the clamping bands to the cup-shaped members. The extreme hydrostatic pressures acting upon the surfaces of the cup-shaped members to cause a contraction or shrinkage of these cup-shaped members do not produce an equal shrinkage or compression of the flanges by virtue of the difference of shapes of the bodies involved. Therefore in a conventional device wherein the flanges are formed either integrally with the walls of the cup-shaped members or are otherwise securely bonded thereto, the contraction of the walls of the cup-shaped members without an accompanying contraction of the flanges develops a concentration of tensional forces at the juncture of the flanges with the walls of the cup-shaped members, which concentration of tensional forces produces a weakness in the structure and often results in a crack in the housing at said juncture and/or leakage of water into the interior of the housing. The device of the present invention enables the cup-shaped members to contract without the creation of any detrimental tensional forces by virtue of the fact that the ribs 22 of the cup-shaped members are permitted to move relative to the ribs 25 on the annular clamping bands since the bands are not integrally formed with or securely bonded to the cup-shaped members. The very slight separation of the cup-shaped members from the annular clamping bands under extreme hydrostatic pressures functions to completely isolate any detrimental tensional forces which otherwise may be produced and would tend to weaken the structure. Such detrimental forces being isolated by the present invention, it may be seen that the housing is designed for submergence to great depths and further that the clamping bands 19 and 21 are utilized to provide a watertight seal between surfaces 15 and 16 which is adequate for initial depths while the hydrostatic pressure upon the exterior of the cup-shaped members is utilized to produce an even tighter seal between surfaces 15 and 16 when the assembly is submerged to greater depths. The aforementioned elimination of any tensional forces tending to act upon the housing is significant for the reason that the strength of ceramic materials is such that they will withstand 400,000 p.s.i. in compression as compared with 25,000 p.s.i. in tension. The strength of high quality steel, by way of comparison, is approximately 150,000 p.s.i. in tension as well as in compression. It is apparent, therefore, that the present invention makes possible the utilization of a polycrystalline material such as ceramics in a magnetometer housing having an exceptionally high strength under compressional forces while preventing the exertion of any tensional forces upon the structure.

The ceramic material utilized in the walls in the casing results in a light-weight assembly having a relative magnetic permeability of one, which properties are very desirable in a magnetometer housing. Contrary to the common beliefs that a ceramic material used in such environment would be brittle and subject to breaking under slight mechanical shocks, it has been found that the ceramic material when used in this environment becomes depth hardened, i.e., hydrostatic pressure exerted upon the exterior of the casing develops compressional forces throughout the walls of the casing and substantially increases the ability of the casing to withstand mechanical shock. By way of contrast, it has been found that conventional metallic vessels undergo depth softening, i.e., when exposed to high hydrostatic pressures, the ability of the metallic vessel to withstand mechanical shocks is decreased. By virtue of the particular structure of the present invention, all tensional forces have been eliminated and the high compressive strength of the ceramic material has been utilized to full advantage to produce a magnetometer housing which is lightweight, has low magnetic permeability, and has a high resistance to mechanical shock when used in its intended environment.

Obviously many modifications and variations of the present invention are possible in the light of the above teachings. It is therefore to be understood that within the scope of the appended claims the invention may be practiced otherwise than is specifically described.

What is claimed is:

1. An underwater magnetometer housing comprising:
   a pair of cup-shaped ceramic members being closed at one end and terminating at the other end in a flat annular surface,
   each of said members having formed thereon a plurality of annular grooves defining a series of annular ribs, wherein each of said ribs is comprised of first and second inclined intersecting annular wall portions of unequal widths and the wall portion nearest the flat annular surface of the cup-shaped member is narrower than the other inclined wall portion, said cup-shaped members being disposed opposite one another with the flat annular surfaces thereof in contacting relationship, thereby forming a closed housing having a substantially smooth exterior surface, a first clamping ring removably secured to the outer peripheral surface of one of said cup-shaped members and having a complementary series of annular grooves formed therein to define a series of annular ribs on the inner peripheral surface thereof in interlocking contact with the annular ribs of said cup-shaped member, a second clamping ring removably secured to the outer peripheral surface of the other of said cup-shaped members and having a complementary series of annular grooves formed therein to define a series of annular ribs on the inner peripheral surface thereof in interlocking contact with the annular ribs of said cup-shaped member, said clamping rings each having a plurality of through bores formed therein, said bores being coaxial with the axes of said rings and being spaced circumferentially around said rings, and a plurality of bolts extending through aligned bores in said annular rings and applying force to said annular rings to move the rings axially toward one another and thereby develop compressive forces in the walls of said cup-shaped members to produce a watertight seal at the juncture of said flat annular surfaces.

2. The magnetometer housing of claim 1 wherein one of said cup-shaped members has an annular groove formed in the flat annular surface thereof, and an O-ring is positioned within said groove in contact with the flat annular surface of the other cup-shaped member.

3. The housing of claim 1 wherein said annular clamping rings are formed of filament reinforced glass fibers.

4. A housing for a magnetic responsive instrument comprising, an elongated cylindrical casing of a ceramic material, said casing having integrally formed spherical end portions and a separable mid-section and having a smooth exterior surface free of any outwardly extending protruding members, said casing having a plurality of annular grooves formed on the outer peripheral surface thereof on either side of said separable mid-section, first and second annular rings having integrally formed ridges on the inner peripheral surfaces of said rings in complementary interlocking engagement with the annular grooves on the outer peripheral surfaces of said casing, clamping means engaging said annular rings to forcibly move said rings in a direction axially toward one another, whereby force applied to said clamping means transmits force to the casing by means of contact between the ridges and the grooves to form a watertight seal at the separable mid-section, electrically conductive contacts sealingly fitted into one wall of the housing and extending through said well, a junction box mechanically coupled to said housing, receiving said contacts and having first and second apertures formed therein, an electrical cable extending through said first aperture and being connected to said contacts, sealing means in said first aperture to prevent leakage of water therethrough, and an elastic membrane sealingly connected to said junction box across said second aperture, said junction box being filled with an incompressible electrically nonconductive liquid, whereby pressure differentials across said first aperture are avoided.

References Cited by the Examiner

UNITED STATES PATENTS

| 1,255,667 | 2/1918 | Thomson | 174—152 X |
| 2,031,849 | 2/1936 | O'Leary | 285—414 X |
| 2,952,378 | 9/1960 | Renslow | 220—5 |

FOREIGN PATENTS

| 399,577 | 3/1925 | Germany. |
| 773,541 | 4/1957 | Great Britain. |
| 215,496 | 10/1941 | Switzerland. |

ROBERT K. SCHAEFER, *Primary Examiner.*

LARAMIE E. ASKIN, *Assistant Examiner.*